Patented Nov. 13, 1945

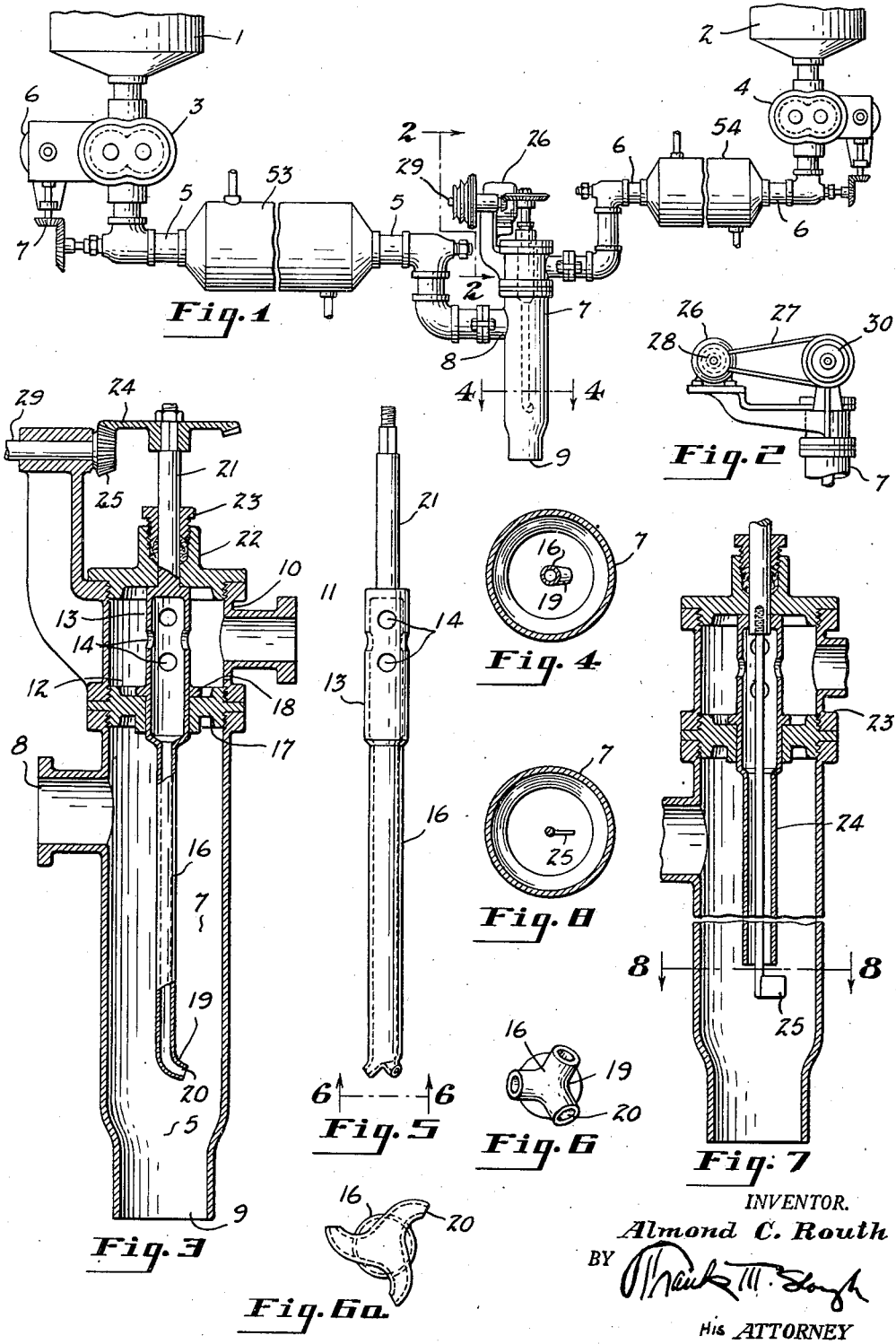

2,389,084

UNITED STATES PATENT OFFICE 2,389,084

APPARATUS FOR MAKING FLAVORED CONFECTIONS

Almond C. Routh, Sandusky, Ohio

Application September 8, 1943, Serial No. 501,725

12 Claims. (Cl. 107—1)

My invention relates to apparatus for making flavored confections and relates more particularly to ice cream or like confections and the extrusion therein of interspersed portions of materials of different colors of ice cream or syrups or the like.

An object of the present invention is to provide improved, more efficient, apparatus for interspersing predetermined proportions of other materials into a confection or ice cream.

Another object of my invention is to achieve the preceding object in an apparatus embodying my invention which may be operated from time to time, and which, upon different operations, will produce approximately uniform results with respect to the relative disposition and aggregate volumes of the relatively mixed materials operated upon.

Other objects of my invention and the invention itself will be better understood by reference to the accompanying drawing which illustrates an embodiment of my invention and to the appended description of the apparatus of said drawing and the method which may be carried out to said apparatus referred to in the drawing.

Fig. 1 is a side elevational view of an embodiment of my invention;

Fig. 2 is a side elevational view, taken on the line 2—2 of Fig. 1, of motor driving apparatus employed in connection with the said embodiment;

Fig. 3 is an enlarged longitudinal medial sectional view of the fluid material mixing apparatus of Fig. 1;

Fig. 4 is a transverse section taken on the line 4—4 of Fig. 1;

Fig. 5 is a side elevational view of a differently constructed inner one of two relatively telescoped fluid tubular extrusion elements of the apparatus provided in the foregoing figures;

Fig. 6 is an end view taken on the line 6—6 of the tubular element of Fig. 5, which comprises another embodiment of extrusion element;

Fig. 6a is a view of the character of that of Fig. 6, being a variant form of said tubular element of Figs. 5 and 6;

Fig. 7 is a view similar to that of Fig. 3 illustrating another embodiment of my invention;

Fig. 8 is a transverse section taken on the line 8—8 of Fig. 7.

Referring first to the embodiment of my invention illustrated in Figs. 1 to 6 inclusive, and initially to Fig. 1, at 1 I show a hopper or container containing ice cream material, which has been previously refrigerated to a desired plastic consistency in an ice cream freezing apparatus, not shown. The ice cream may be frozen by a continuously operated apparatus in fluid flow communication to the receptacle 1 or the receptacle 1 may be of such size as to permit the ice cream material to be deposited therein from time to time.

At 2, I show a second receptacle which is the source of a second fluid or plastic material, such as flavoring material, proposed by the apparatus of my invention to be mixed in an interspersed manner with the ice cream material.

At 3 and 4 I show suitable motor driven pumps which may be employed to draw the ice cream materials and flavoring or other variant materials from their respective receptacles 1 and 2 and to respectively force said materials through the conduits 5 and 6 to the mixing apparatus illustrated in Fig. 1 as a part of the apparatus thereof.

The mixing apparatus preferably comprises, as illustrated, an ice cream receiving, mixing and discharging tube 7 having an ice cream inlet at 8 into which ice cream from the conduit 5 is passed, and a mixture discharging orifice at 9. It comprises further a flavoring material receiving tube 10 disposed within the tube 7, receiving a variant material from the receptacle 2 through the conduit 6 by means of an inlet 11 disposed in a tube 10 disposed in alignment with the tube 7 and spaced therefrom by means of a transverse wall 17 separating the tubes, each of said tubes being secured thereto. The inlet 11 in the form of my invention illustrated herein is disposed at an opposite side of the tube 10 from the inlet 8 in the tube 7 and is above said inlet 8.

For communicating the relatively minor quality of variant material from the source 2 to the zone 15 within the tubular chamber 7 where it is interspersed into the body of ice cream continuously flowing through the chamber or tube 7 from its inlet 8 to the discharge port 9, the tube 16 is formed of substantially less diameter than the tube 7 and is positioned substantially axially of the tube 7 with an upper preferably enlarged end portion 13 projected preferably axially within the tube portion 10. The enlarged end portion 13 of the tube 16 is preferably laterally perforated at a plurality of portions of its lateral walls, as at 14, whereby the variant material from the source 2 received through the port 11 into the chamber 12 under pressure is continuously forced through the apertures 14 into the interior of the upper portion of the tube 16.

The upper portion of the tubular compartment 7 merely receives the ice cream passing through the conduit 5 through the inlet 8 thereof. In the lower portion of the tubular compartment 7, the two variant materials, such as ice cream and flavoring syrup or sherbet or the like, are mixed in such a way that the flavoring or other variant material from the source 2 is deposited in substantially predetermined manner in interspersed portions throughout the mass of the ice cream material entering the upper portion of said chamber, the material passing from the discharge port 9 to any suitable ice cream mixture receptacle, which may take the form of ice cream molding containers or open mouthed packages, the latter employed for packing unit quantities of ice cream for commercial distribution.

A flange 18 carried by the enlarged portion 13 is adapted to be seated on a portion of a transverse wall 17 separating the mix chamber 7 and the chamber 12 and the tube 16 in its enlarged portion is therefore telescoped through a central aperture in the wall 17 and makes substantially fluid type contact with the portions of the wall 17 outlining the said aperture. The element 16, the tubular portions of which have been described, terminates at its lower end in a laterally bent portion 19 to present its discharge ports 20 in a downward lateral direction at a preferably acute angle to the axis of the tube 7 and terminates at its upper end in a preferably solid stem 21, which is of lesser diameter at the region of junction of said stem with the enlarged upper end of the enlarged tubular portion 13 of the tube 16 to provide a shoulder 22 adapted to abut a closure cap 23 for the upper end of the chamber 12, provided with a regulator proof central bearing for the stem 21 of the element 16.

The entire element 16 is rotated by rotation of the stem 21 through the gear 24 and pinion 25 driven from a suitable source of power, such as a motor 26, illustrated in Fig. 2 driving a belt 27 by a motor pulley 28, said belt communicating rotary motion to a shaft 29 which carries the pinion 25 through the pulley 30, said belt passing over both said motor driven pulley 28 and the driven pulley 30 to cause rotation of the shaft 29.

It will hence be readily understood in what manner the ice cream injected into the tube 7 under pressure has interspersed therein material received from the rotating tube 16, said material being pumped into the chamber 12 and forced through the orifices 14 in the enlarged portion 13 of the tube 16 out the discharge ports thereof 20 into the flow of ice cream.

Although I have illustrated and described the tube 16 as rotating, it is to be understood that it is within the purview of my invention that a similar tube might be caused to oscillate to accomplish the purposes of this invention.

As shown in Figs. 5 and 6 the embodiment of Figs. 1 to 4 inclusive has the tube 16 constructed with three discharge ports 20 at the free end of the tube, said ports all extending in a downward lateral direction, and at an angle to each other, and said ports may be of different lengths, or different formation, as may be desired.

In the foregoing embodiments, I have described a laterally bent tubular extension 19 of the tube 16 provided for the purpose of deflecting the flow of the minor variant material laterally. In Fig. 7, I illustrate a variant form of material deflecting means which may take different forms.

For example, in the form of my invention illustrated in Fig. 7, a rod 31 is disposed through the tube 32, said rod having a thin piece of metal secured to the bottom thereof, said metal piece 33 being in the nature of a vane, whereby the syrup or variant material disposed in the tube 32 is distributed in the ice cream to achieve the interspersed effect of such material in the ice cream, the rod being rotated or oscillated by motor driven means, similar to those employed in connection with the form of my invention illustrated in Figs. 1 to 6 inclusive.

In the appended claims, the term "rotate," unless otherwise restricted, is to be understood to mean rotational movement of whatever degree and which may be of slight arcuate extent or involve complete rotation or may involve a certain amount of movement and its reversal in direction to achieve an oscillatory movement.

Although I have illustrated and described my invention in connection with certain preferred embodiments thereof, it is to be understood that numerous and extensive departures may be made therefrom without, however, departing from the spirit of my invention or the scope of the appended claims.

I claim:

1. A mechanism for preparing an ice cream or like material composed of a major portion of said material and a minor portion of a differently appearing similar substance, comprising a relatively large extrusion tube for said material through which it may be forced under pressure, and a substantially smaller tube for conveying said substance concurrently forced under pressure therethrough, said smaller tube telescopically disposed within the larger tube and terminating, a substantial distance above the discharge port thereof, in at least one discharge port, said small tube port directed substantially laterally of the direction of travel of said material in the large tube and thereby continuously forcing at least one minor stream of said substance into the flowing body of the material surrounding it and means to rotate said small tube to continuously vary the direction of discharge of said substance into the encompassing body of said material.

2. A mechanism for preparing an ice cream or like material, composed of a major portion of a fluent ingredient and a minor portion of a different fluent ingredient, comprising a relatively large extrusion tube adapted to conduct said first named ingredient and a relatively small extrusion tube adapted to conduct said different ingredient, said small extrusion tube being longitudinally disposed within said large extrusion tube, separate means adapted to communicate the respective said ingredients under fluid pressure to corresponding end portions of the respective tubes, and at least one laterally directed tubular extension means for said small extrusion tube, said extension means terminating in a discharge port directed laterally towards said larger extrusion tube inner walls and spaced therefrom, and means to rotate one of said extrusion tubes relative to the other extrusion tube about a longitudinal axis.

3. A mechanism for preparing an ice cream mixture or the like composed of a major portion of one material and a minor portion of a different material, comprising a relatively large extrusion tube for the material constituting the major portion of the confection and a relatively smaller tube for the material constituting the minor portion of different material, said smaller tube telescopically disposed substantially axially within the larger tube and terminating a substantial distance inwardly of the outer end portion of said larger tube, discharge means for directing the discharge of said different material laterally from the smaller tube comprising a motor and a motor-driven rotatable, material-deflecting element, said element being moved by said motor in a circuitous path about the axis of said large tube and adapted to constantly circuitously direct the flow of said different material from the lower terminus of the smaller tube laterally in different directions from the longitudinal axis of said smaller tube.

4. A mechanism according to claim 3 and characterized by said discharge means comprising motor-driven means disposed longitudinally within said smaller tube, said means extending outwardly of said smaller tube and carrying at its outer end an impeller, said impeller disposed within the stream of flow of the said different material.

5. The mechanism according to claim 3 characterized by said element comprising a laterally extending tubular extension of said smaller tube.

6. A mechanism according to claim 2 and characterized by the provision of a plurality of said tubular extensions for said small tube, said extensions being each pointed in a different lateral direction.

7. A mechanism for preparing an ice cream or like mixture composed of a major portion of a first fluent ingredient and a minor portion of a second fluent ingredient, said mechanism comprising a pair of relatively telescoped tubes, the inner tube adapted to conduct one of said ingredients and the outer tube adapted to conduct the other ingredient, respective means to respectively supply under fluid pressure the respective ingredient to each of said tubes near corresponding ends thereof, power means to relatively rotate the tubes, said inner tube having a discharge portion disposed intermediate the inlet and outlet ends of the larger tube, said portion provided with at least one laterally directed tubular discharge element.

8. A mechanism for interspersing a minor ingredient throughout the body of a major ingredient of an ice cream mix, said mechanism comprising a relatively large tube for conducting the major ingredient, and means comprising a second tube for directing a second ingredient to a transverse zone disposed within the walls of said first tube and intermediate the ends thereof, means to effect communication under fluid pressure of the respective ingredients to inlet portions of the respective tubes, said directing means comprising fluid deflecting means disposed in the path of flow of the said second ingredient in said zone, and adapted to deflect said second ingredient in a lateral direction relative to the longitudinal axis of the large tube, and power means to cyclically move said deflecting means to direct said flow progressively in different lateral directions.

9. The mechanism according to claim 8 characterised by said deflecting means comprising a laterally directed tubular outlet extension of said second tube.

10. The mechanism according to claim 8 wherein said deflecting means comprises a rotatable vane disposed within the stream of flow of said second ingredient in said zone.

11. The mechanism according to claim 8 characterized by said deflecting means comprising a plurality of laterally directed tubular outlet extensions of said second tube, each of said tubular extensions being directed in relatively different angular directions.

12. A mechanism for preparing an ice cream or like material composed of at least two different ingredients, one a major and the other a minor ingredient, said mechanism comprising at least one relatively large tube for conducting the major ingredient and means comprising a relatively smaller tube for directively delivering the minor ingredient to a mixing zone disposed intermediately within the larger tube, means to supply to each said tube its respective ingredient under flow inducing pressure, said larger tube having an outlet end portion projecting beyond said mixing zone, the said projecting tube portion being so dimensioned as to offer substantial resistance to the flow of said material passed therethrough, whereby said material in the region of said zone is maintained under substantial pressure, said smaller tube adapted to deliver said minor ingredient to the central portion of said zone and said delivering means also comprising a rotatable element for laterally deflecting said minor ingredient to more laterally disposed portions of said zone, and power means to rotate said rotatable element whereby said minor ingredient is laterally dispersed in all directions, into the body of said major ingredient passing through said zone.

ALMOND C. ROUTH.